US008453818B2

United States Patent
Kito et al.

(10) Patent No.: US 8,453,818 B2
(45) Date of Patent: Jun. 4, 2013

(54) AUTOMATIC TRANSMISSION

(75) Inventors: Masashi Kito, Anjo (JP); Masaaki Nishida, Anjo (JP); Tomoko Nishida, legal representative, Anjo (JP); Hiroshi Kato, Kariya (JP); Norihiro Tokunaga, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 559 days.

(21) Appl. No.: 12/461,722

(22) Filed: Aug. 21, 2009

(65) Prior Publication Data

US 2010/0078282 A1    Apr. 1, 2010

(30) Foreign Application Priority Data

Aug. 22, 2008   (JP) ................ 2008-214694

(51) Int. Cl.
*F16D 21/00*   (2006.01)

(52) U.S. Cl.
USPC ............. 192/48.619; 192/85.25; 192/106 F

(58) Field of Classification Search
USPC ............ 475/146, 116; 192/48.619, 85.25, 192/106 F
See application file for complete search history.

(56) References Cited

U.S. PATENT DOCUMENTS

| | | | |
|---|---|---|---|
| 5,887,690 A | 3/1999 | Haupt | |
| 6,454,074 B1 * | 9/2002 | Kundermann et al. | 192/48.618 |
| 6,464,059 B1 * | 10/2002 | Kundermann et al. | 192/48.618 |
| 6,499,578 B1 * | 12/2002 | Kundermann et al. | 192/48.618 |
| 7,001,301 B2 * | 2/2006 | Wittkopp | 475/146 |
| 7,731,623 B2 * | 6/2010 | Nishida et al. | 475/275 |
| 8,002,663 B2 * | 8/2011 | Nishida et al. | 475/284 |
| 8,083,627 B2 * | 12/2011 | Kito et al. | 475/146 |
| 2005/0067251 A1 * | 3/2005 | Braford et al. | 192/70.12 |
| 2007/0184932 A1 | 8/2007 | Tabata et al. | |
| 2009/0082155 A1 | 3/2009 | Kato | |

FOREIGN PATENT DOCUMENTS

| | | |
|---|---|---|
| JP | A-1-210624 | 8/1989 |
| JP | A-7-269665 | 10/1995 |
| JP | A-2002-161952 | 6/2002 |
| JP | A-2003-343666 | 12/2003 |
| JP | B2-3636467 | 4/2005 |
| JP | A-2005-273768 | 10/2005 |
| JP | U-3121527 | 5/2006 |
| JP | A-2006-342845 | 12/2006 |
| JP | A-2007-32624 | 2/2007 |

OTHER PUBLICATIONS

International Search Report issued in PCT/JP2009/004018 issued on Sep. 15, 2009.
Mar. 27, 2012 Office Action issued in Korean Patent Application No. 10-2010-7019569 (English Translation only).

* cited by examiner

*Primary Examiner* — Justin Holmes
*Assistant Examiner* — Stacey Fluhart
(74) *Attorney, Agent, or Firm* — Oliff & Berridge, PLC

(57) ABSTRACT

An automatic transmission includes first and second clutches disposed adjacent, wherein each of the first and second clutches includes a friction plate; a clutch drum in spline engagement with the friction plate; a piston that with the clutch drum forms a hydraulic oil chamber therebetween; a return spring that biases the piston toward the hydraulic oil chamber side; and a cancel plate that is disposed on a side opposite the hydraulic oil chamber of the piston to form a cancel oil chamber that cancels outs a centrifugal hydraulic pressure that acts on the hydraulic oil chamber, and that receives a reaction force of the return spring.

11 Claims, 6 Drawing Sheets

FIG.2

|      | C1 | C2 | C3 | C4 | B1 | B2  | F1 |
|------|----|----|----|----|----|-----|----|
| 1st  | ●  |    |    |    |    | (●) | ●  |
| 2nd  | ●  |    |    |    | ●  |     |    |
| 3rd  | ●  |    | ●  |    |    |     |    |
| 4th  | ●  |    |    | ●  |    |     |    |
| 5th  | ●  | ●  |    |    |    |     |    |
| 6th  |    | ●  |    | ●  |    |     |    |
| 7th  |    | ●  | ●  |    |    |     |    |
| 8th  |    | ●  |    |    | ●  |     |    |
| Rev1 |    |    | ●  |    |    | ●   |    |
| Rev2 |    |    |    | ●  |    | ●   |    |

(●): ENGINE BRAKE IN OPERATION

AUTOMATIC TRANSMISSION

CROSS-REFERENCE TO RELATED APPLICATION

The disclosure of Japanese Patent Application No. 2008-214694 filed on Aug. 22, 2008 including the specification, drawings and abstract is incorporated herein by reference in its entirety.

BACKGROUND

The present invention relates to a multi-speed automatic transmission installed in a vehicle or the like, and more specifically relates to an automatic transmission that includes first and second clutches disposed adjacent, wherein a clutch drum of the first clutch is pushed by hydraulic pressure or the like generated in a hydraulic servo of the second clutch.

Recent automatic transmissions installed in vehicles have been designed with more speeds, e.g. eight forward speeds and the like, to achieve better vehicle fuel efficiency and reduce emissions, and must also achieve a compact arrangement of many components including clutches from the standpoint of vehicle mountability.

A multi-speed automatic transmission requiring such compactness arranges two clutches (particularly the hydraulic servos thereof) adjacent to one another (see Japanese Patent Application Publication No. JP-A-2005-273768). The two clutches each have a friction plate formed from multiple discs and a hydraulic servo that pressably drives the friction plate. The hydraulic servos each include a piston, a hydraulic oil chamber that drives the piston, and a cancel oil chamber that cancels out a centrifugal oil pressure of the hydraulic chamber.

SUMMARY

However, when arranging the two clutches side by side as in Japanese Patent Application Publication No. JP-A-2005-273768, especially for the purpose of a more compact design, leaving no space between the layout of the clutch drum (60) of one clutch (C4) and the cancel oil chamber (70) of the other clutch (C3) results in the clutch drum (60) becoming subject from behind to a force generated in the hydraulic servo of the other clutch (C3), and also subject to the centrifugal oil pressure of the cancel oil chamber (70) in particular.

Especially for transmissions where two clutches have the same rotation and no relative rotation is generated in their respective clutch drums, a double structure is not necessary for the inner perimeter portions of the hydraulic servos. The flange portion of the clutch drum (60) of the internal clutch (C4) is simply positioned fixed with respect to the clutch drum (50) of the other clutch (C3). Specifically, according to Japanese Patent Application Publication No. JP-A-2005-273768 and as shown in FIG. 2 thereof, a root portion of the clutch drum (60) is welded to the clutch drum (50).

However, the centrifugal oil pressure of the cancel oil chamber obviously increases toward the outer perimeter side as a result of the centrifugal force. Therefore, the clutch drum formed as described above is subjected from behind to the centrifugal oil pressure of the cancel oil chamber. Especially at high speeds, the outer perimeter side is strongly pressed from behind to the piston side, which generates a large torsional moment with the root portion acting as the fulcrum. The outer perimeter side of the clutch drum in particular may thus deform into a shape similar to a conical spring, for example. Deformation of the clutch drum in this manner is not desirable in terms of durability, and also results in deformation of the entire hydraulic servo. Such deformation may impact the orientation of the friction plate and also adversely affect the control precision of the clutch engagement control, thus generating shift shock or the like. Increasing the thickness of the clutch drum to improve its strength is obviously one countermeasure, but this defeats the object of arranging the two clutches adjacent to achieve a more compact transmission.

Hence, it is an object of the present invention to provide an automatic transmission that retains compactness from an adjacent arrangement of first and second clutches, while also suppressing deformation of a clutch drum of the first clutch.

The present invention is an automatic transmission that has first and second clutches disposed adjacent, wherein each of the first and second clutches includes a friction plate; a clutch drum in spline engagement with the friction plate; a piston that with the clutch drum forms a hydraulic oil chamber therebetween; a return spring that biases the piston toward the hydraulic oil chamber side; and a cancel plate that is disposed on a side opposite the hydraulic oil chamber of the piston to form a cancel oil chamber that cancels outs a centrifugal hydraulic oil pressure that acts on the hydraulic oil chamber, and that receives a reaction force of the return spring. The automatic transmission is characterized in that the clutch drum of the second clutch includes a first base portion having a cylindrical shape that surrounds the clutch drum of the first clutch and supports the clutch drum of the first clutch on an inner perimeter side of the clutch drum of the first clutch; and a second base portion having a cylindrical shape that is disposed more toward an outer perimeter side than the first base portion, and supports the cancel plate of the second clutch on the inner perimeter side of the cancel plate of the second clutch. The second base portion includes an end portion that intersects and runs through the clutch drum of the first clutch at a more outer perimeter portion than the hydraulic oil chamber of the first clutch. A restricting member is provided that restricts the clutch drum of the first clutch in a direction that the clutch drum is retained on the end portion of the second base portion running therethrough. The cancel plate of the second clutch is contacted and supported by the clutch drum of the first clutch.

Specifically, the present invention is characterized in that the first base portion and the second base portion are integratedly formed through a flange portion.

More specifically, the present invention is characterized in that a portion of the clutch drum of the first clutch is formed with a cylinder portion and an inner perimeter side of the clutch drum is supported by the first base portion, wherein an oil passage that communicates with the cancel oil chamber of the second clutch is formed between the clutch drum of the first clutch and the flange portion by sealing spaces between the first base portion and the clutch drum, and the second base portion and the clutch drum.

More specifically, the present invention is characterized in that the clutch drum of the first clutch is formed divided into a drum member that is engaged with the friction plate, and a cylinder member that forms the hydraulic oil chamber and is supported by the drum member in an axial direction; the drum member of the clutch drum of the first clutch is supported by the second base portion through the restricting member; and an oil passage that communicates with the cancel oil chamber of the second clutch is formed between the cylinder member and the flange portion by sealing spaces between the first base portion and the cylinder member, and the second base portion and the cylinder member.

Even more specifically, the present invention is characterized in that the cylinder member is press-worked so as to have a first protruding portion that projects toward the piston side, and a second protruding portion that projects toward the flange portion side, wherein the first and second protruding portions are disposed out of phase at different positions on the same radius.

In addition, the present invention is characterized in that the end portion of the second base portion is formed into a comb shape, and the clutch drum of the first clutch is formed into a shape that aligns with the comb shape and formed with a plurality of through holes through which the end portion of the second base portion runs through.

Specifically, the present invention is characterized in that an outer-perimeter end portion of the piston of the first clutch is formed into a spline configuration, and engaged relatively unrotatable to the comb-shaped end portion of the second base portion.

Note that the above reference numerals in parentheses are used to reference the drawings and to aid in understanding the invention, but do not exert any influence on the constitution described in the claims.

According to a first aspect of the present invention, a second base portion is disposed more toward the outer perimeter side than a first base portion in a clutch drum of a second clutch, and is provided extending such that an end portion of the second base portion intersects and runs through a clutch drum of a first clutch at a more outer perimeter portion than a hydraulic oil chamber. Furthermore, the clutch drum of the first clutch is supported by the second base portion and restricted by a restricting member in the direction that the clutch drum is retained on the end portion of the second base portion running therethrough. A cancel plate of the second clutch is also contacted and supported by the clutch drum of the first clutch. Therefore, although centrifugal hydraulic pressure from a cancel oil chamber of the second clutch acts on the clutch drum of the first clutch through the cancel plate of the second clutch, the clutch drum of the first clutch can be supported by the restricting member and the second base portion more toward the outer perimeter side. Accordingly, if the first clutch and the second clutch are disposed adjacent in order to maintain compactness, and the clutch drum of the first clutch is pressed from behind by the centrifugal hydraulic pressure of the cancel oil chamber of the second clutch, deformation of the clutch drum of the first clutch can be suppressed without increasing the thickness of the clutch drum of the first clutch. In other words, durability can be improved while maintaining compactness. Furthermore, clutch controllability can also be improved. In addition, the automatic transmission can be made more compact in the axial direction, compared to when the cancel plate of the second clutch is positioned and supported on the second base portion by a snap ring or the like, for example.

According to a second aspect of the present invention, the first base portion and the second base portion are integratedly formed through a flange portion, thereby achieving sufficient strength as a member that supports the clutch drum of the first clutch.

According to a third aspect of the present invention, an oil passage that communicates with the cancel oil chamber of the second clutch is formed between the clutch drum of the first clutch and the flange portion. Therefore, the centrifugal hydraulic pressure from oil for the cancel oil chamber of the second clutch acts from behind on the clutch drum of the first clutch. However, this centrifugal hydraulic pressure is canceled out by the centrifugal hydraulic pressure of the hydraulic oil chamber of the first clutch. Consequently, deformation of the clutch drum of the first clutch is suppressed.

According to a fourth aspect of the present invention, an oil passage that communicates with the cancel oil chamber of the second clutch is formed between a cylinder member of the first clutch and the flange portion. Therefore, the centrifugal hydraulic pressure from oil for the cancel oil chamber of the second clutch acts from behind on the cylinder member of the first clutch. However, this centrifugal hydraulic pressure is canceled out by the centrifugal hydraulic pressure of the hydraulic oil chamber of the first clutch. Consequently, centrifugal hydraulic pressure acting on a drum member is suppressed.

According to a fifth aspect of the present invention, first and second protruding portions are disposed out of phase at different positions on the same radius on the cylinder member. Therefore, through simple press work alone, attachment between the cylinder member and a piston can be prevented. Furthermore, clearance can also be secured for the oil passage that communicates with the cancel oil chamber of the second clutch and is formed between the cylinder member and the flange portion.

According to a sixth aspect of the present invention, the end portion of the second base portion is formed into a comb shape, and the clutch drum of the first clutch is formed with a plurality of through holes formed into a shape that aligns with the comb shape and through which the end portion of the second base portion runs through. Therefore, the second base portion can intersect and run through the clutch drum of the first clutch.

According to a seventh aspect of the present invention, a structure where an end portion of the piston of the first clutch is formed into a spline configuration and engaged relatively unrotatable to the comb-shaped end portion of the second base portion, and where the second base portion intersects and runs through the clutch drum of the first clutch can be used to prevent rotation of the piston.

BRIEF DESCRIPTION OF THE DRAWINGS

FIG. 2 is an engagement chart of the automatic transmission according to the present invention.

DETAILED DESCRIPTION OF EMBODIMENTS

Embodiments of the present invention will be described below with reference to the drawings.

Figure 1:
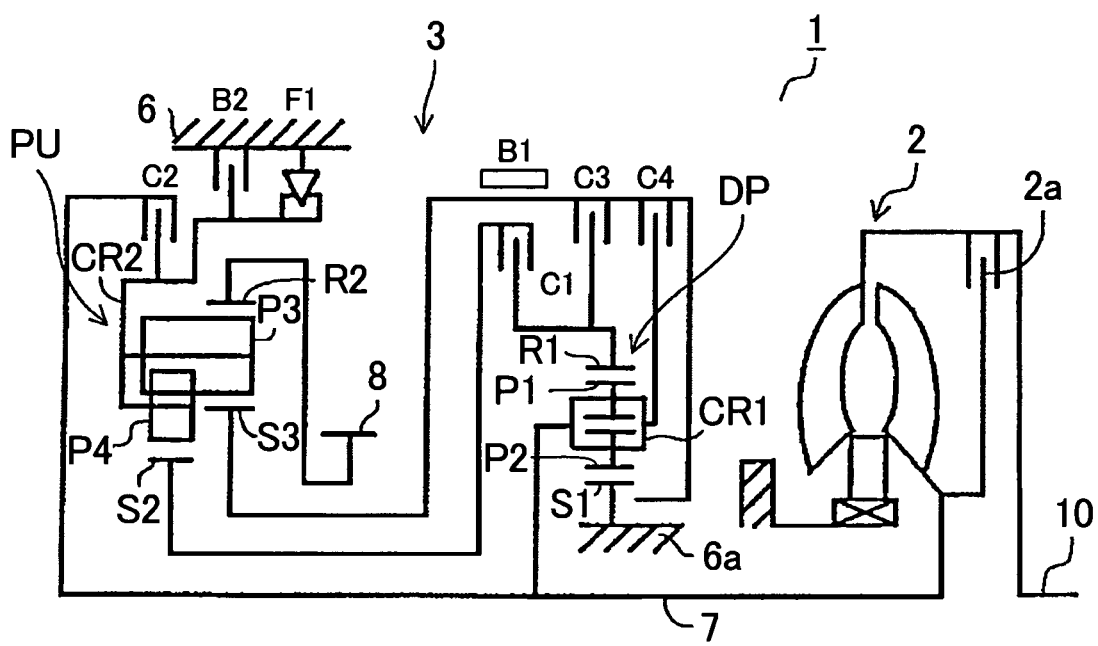
FIG. 1 is a skeleton diagram that schematically shows an automatic transmission according to the present invention.
Figure 1:
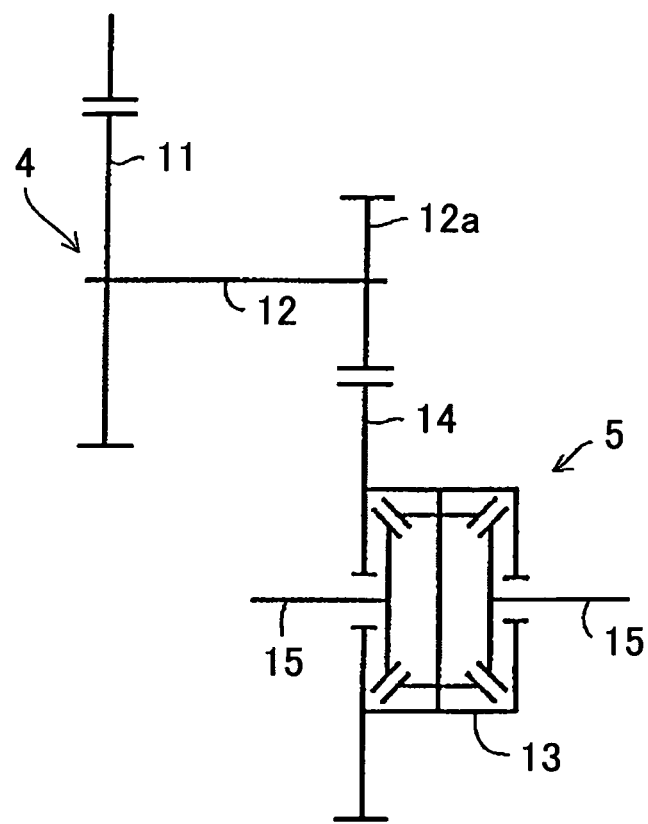
Figure 3:
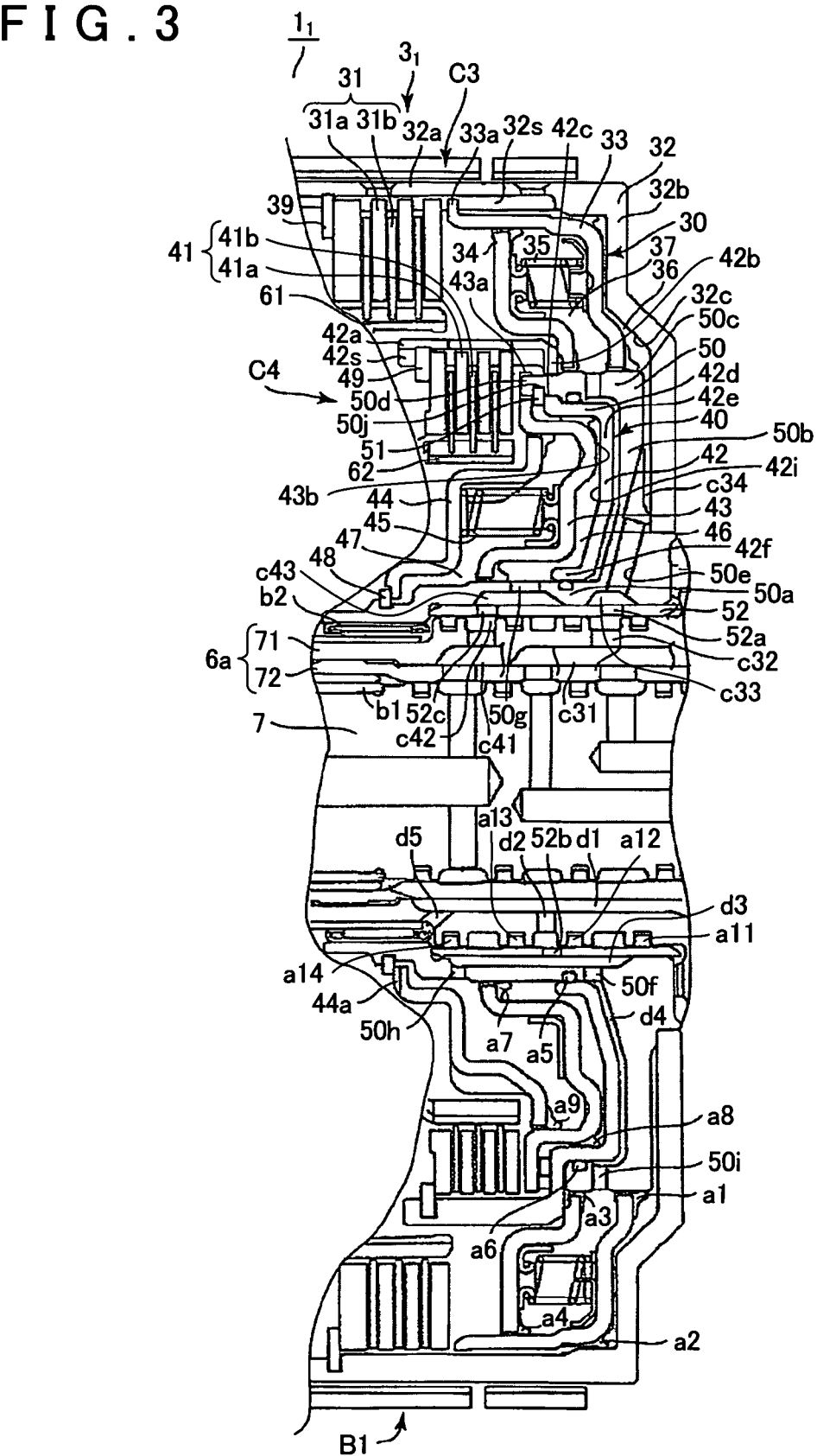
FIG. 3 is a cross-sectional view that shows third and fourth clutch portions of the automatic transmission according to the present invention.
Figure 6:
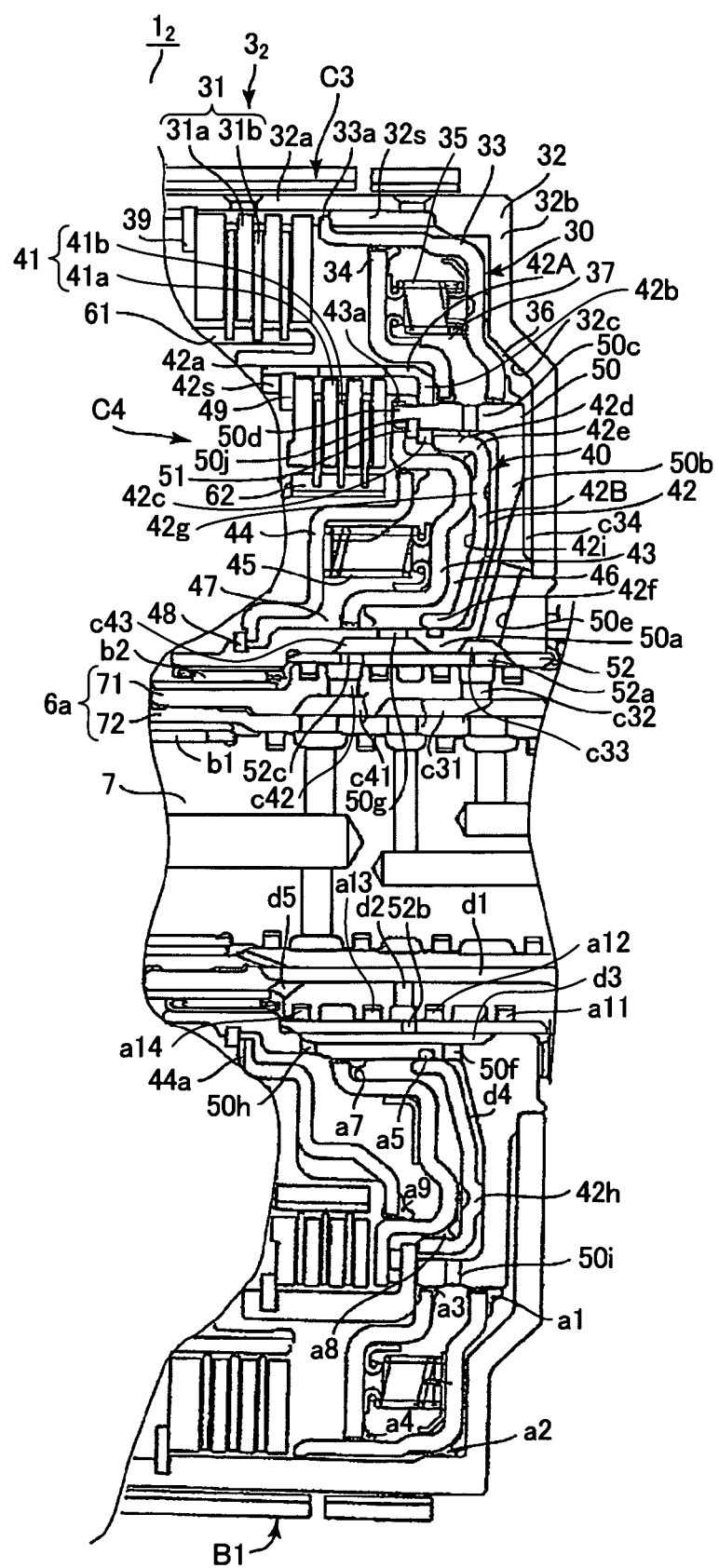
FIG. 6 is a cross-sectional view that shows third and fourth clutch portions of an automatic transmission according to another embodiment.

An automatic transmission according to the present invention is a preferred automatic transmission for installation in a vehicle with a transverse engine (drive source) such as the front engine, front wheel drive (FF) type or the like. In FIGS. 1, 3 and 6, the horizontal direction corresponds to the lateral direction of the automatic transmission in its installed state in the vehicle, but for the purposes of the explanation that follows, the right side of the drawings, which is the side where the engine is located, is the front side, and the left side is the rear side.

First, the overall configuration of an automatic transmission 1 that can apply the present invention will be explained with reference to FIG. 1. As shown in FIG. 1, the automatic transmission 1 for the FF type vehicle includes a case 6 that is made up of a housing case and a transmission case. The front side of the case 6 has an input member (front cover and center piece) 10 by which the automatic transmission 1 can be linked to an engine not shown in the drawings. Furthermore, a torque converter 2 having a lock-up clutch 2a is disposed in the automatic transmission 1, and a speed change mechanism 3, a counter shaft portion 4, and a differential portion 5 are disposed within the transmission case 6.

The torque converter 2 is disposed on an axis that is centered on an input shaft 7 of the speed change mechanism 3 that is on the same axis as an output shaft of the engine (not shown). In addition, the counter shaft portion 4 is disposed on a counter shaft 12 that is on an axis parallel to the input shaft 7, while the differential portion 5 is disposed so as to have right and left axles 15 on an axis parallel to the counter shaft 12.

A deceleration planetary gear (hereinafter simply called a "planetary gear") DP that decelerates the rotation of the input shaft 7 is provided on the input shaft 7. A planetary gear unit PU is provided to the rear of the planetary gear DP.

As shown in FIG. 1, the planetary gear DP includes a first sun gear S1, a first carrier CR1, and a first ring gear R1. The planetary gear DP is a so-called double pinion planetary gear in which a pinion P2 that meshes with the first sun gear S1 and a pinion P1 that meshes with the first ring gear R1 both mesh with the first carrier CR1.

On the other hand, the planetary gear unit PU includes, as four rotating elements, a second sun gear S2, a third sun gear S3, a second carrier CR2, and a second ring gear R2. The planetary gear unit PU is a so-called Ravigneaux type planetary gear in which a long pinion P3 that meshes with the third sun gear S3 and the second ring gear R2 and a short pinion P4 that meshes with the second sun gear S2 and the long pinion P3 both mesh with the second carrier CR2.

The rotation of the first sun gear S1 of the planetary gear DP is held stationary in relation to the case (transmission case) 6 via a boss portion 6a described in detail later. The carrier CR1 is connected to the input shaft 7 and rotates together with the rotation of the input shaft 7 (hereinafter called the "input rotation"). The carrier CR1 is also connected to a fourth clutch C4 (first clutch). The stationary first sun gear S1 and the first carrier CR1 that does the input rotation cause the first ring gear R1 to do deceleration rotation that decelerates the input rotation. The first ring gear R1 is also connected to a first clutch C1 and a third clutch C3 (second clutch).

The third sun gear S3 of the planetary gear unit PU is connected to a first brake B1 formed from a hand brake and is stationary in relation to the case 6. The third sun gear S3 is also connected to the fourth clutch C4 and the third clutch C3. The input rotation of the first carrier CR1 through the fourth clutch C4 and the deceleration rotation of the first ring gear R1 through the third clutch C3 are input to the third sun gear S3. The second sun gear S2 is connected to the first clutch C1, and the deceleration rotation of the first ring gear R1 is input to the second sun gear S2.

The second carrier CR2 is connected to a second clutch C2 into which the rotation of the input shaft 7 is input and through which the input rotation is input to the second carrier CR2. The second carrier CR2 is also connected to a one-way clutch F1 and a second brake B2. The rotation that is input through the one-way clutch F1 is restricted to rotation in one direction in relation to the case 6, and the rotation that is input through the second brake B2 is stationary. The second ring gear R2 is connected to a counter gear 8 that is rotatably supported in relation to a center support member that is fixed to the transmission case 6.

A large diameter gear 11 that is fixed on the countershaft 12 of the countershaft portion 4 meshes with the counter gear 8. A gear 14 of the differential portion 5 meshes with the countershaft 12 through a small diameter gear 12a that is formed on the outer perimeter surface of the countershaft 12. The gear 14 is fixed to a differential gear 13 and is connected to the left and right axles 15, 15 through the differential gear 13.

Next, based on the configuration described above, the operation of the speed change mechanism 3 will be explained with reference to FIGS. 1 and 2.

For example, in a first forward speed (1st) of the Drive (D) range, as shown in FIG. 2, the first clutch C1 and the one-way clutch F1 are engaged. In this state, the first sun gear S1, which is stationary, and the first carrier CR1, which does the input rotation, cause the rotation of the first ring gear R1, which does the deceleration rotation, to be input to the second sun gear S2 through the first clutch C1. The rotation of the second carrier CR2 is restricted to the one direction (the forward rotation direction), that is, the second carrier CR2 is in a fixed state in which reverse rotation is prevented. Thus the deceleration rotation that is input to the second sun gear S2 is output to the second ring gear R2 through the fixed second carrier CR2, and the forward rotation is output as the first forward speed from the counter gear 8.

Note that during engine braking (during coasting), the second brake B2 is engaged and the second carrier CR2 is stationary, such that the first forward speed state is maintained in a form that prevents the forward rotation of the second carrier CR2. Moreover, in the first forward speed, the reverse rotation of the second carrier CR2 is prevented by the one-way clutch F1 while the forward rotation is permitted, so the shift into the first forward speed, such as when a shift is made from the non-drive range to the drive range, for example, can be accomplished smoothly by the automatic engagement of the one-way clutch F1.

In a second forward (2nd) speed, the first clutch C1 is engaged, and the first brake B1 is engaged. In this state, the first sun gear S1, which is stationary, and the first carrier CR1, which does the input rotation, cause the rotation of the first ring gear R1, which does the deceleration rotation, to be input to the second sun gear S2 through the first clutch C1. The engaging of the first brake B1 also makes the rotation of the third sun gear S3 stationary. In this state, the deceleration rotation of the second carrier CR2 becomes slower than that of the second sun gear S2, such that the deceleration rotation that is input to the second sun gear S2 is output through the second carrier CR2 to the second ring gear R2, and the forward rotation is output as the second forward speed from the counter gear 8.

In a third forward (3rd) speed, the first clutch C1 and the third clutch C3 are engaged. In this state, the first sun gear S1, which is stationary, and the first carrier CR1, which does the input rotation, cause the rotation of the first ring gear R1, which does the deceleration rotation, to be input to the second sun gear S2 through the first clutch C1. The engaging of the third clutch C3 also causes the deceleration rotation of the first ring gear R1 to be input to the third sun gear S3. In other words, the deceleration rotation of the first ring gear R1 is input to the third sun gear S3 and the second sun gear S2, so the planetary gear unit PU becomes directly coupled to the deceleration rotation. The deceleration rotation is thus output to the second ring gear R2, and the forward rotation is output as the third forward speed from the counter gear 8.

In a fourth forward (4th) speed, the first clutch C1 and the fourth clutch C4 are engaged. In this state, the first sun gear S1, which is stationary, and the first carrier CR1, which does the input rotation, cause the rotation of the first ring gear R1, which does the deceleration rotation, to be input to the second sun gear S2 through the first clutch C1. The engaging of the fourth clutch C4 also causes the input rotation of the first carrier CR1 to be input to the third sun gear S3. The deceleration rotation of the second carrier CR2 thus becomes faster than that of the second sun gear S2, such that the deceleration rotation that is input to the second sun gear S2 is output through the second carrier CR2 to the second ring gear R2, and the forward rotation is output as the fourth forward speed from the counter gear 8.

In a fifth forward (5th) speed, the first clutch C1 and the second clutch C2 are engaged. In this state, the first sun gear S1, which is stationary, and the first carrier CR1, which does the input rotation, cause the rotation of the first ring gear R1, which does the deceleration rotation, to be input to the second sun gear S2 through the first clutch C1. The engaging of the second clutch C2 causes the input rotation to be input to the second carrier CR2. In this state, the deceleration rotation that is input to the second sun gear S2 and the input rotation that is input to the second carrier CR2 make the deceleration rotation faster than in the fourth forward speed, such that the deceleration rotation is output to the second ring gear R2, and the forward rotation is output as the fifth forward speed from the counter gear 8.

In a sixth forward (6th) speed, the second clutch C2 and the fourth clutch C4 are engaged. The engaging of the fourth clutch C4 causes the input rotation of the first carrier CR1 to be input to the third sun gear S3. The engaging of the second clutch C2 causes the input rotation to be input to the second carrier CR2. In other words, the input rotation is input to the third sun gear S3 and the second carrier CR2, so the planetary gear unit PU becomes directly coupled to the input rotation. The input rotation is thus output to the second ring gear R2, and the forward rotation is output as the sixth forward speed from the counter gear 8.

In a seventh forward (7th) speed, the second clutch C2 and the third clutch C3 are engaged. In this state, the first sun gear S1, which is stationary, and the first carrier CR1, which does the input rotation, cause the rotation of the first ring gear R1, which does the deceleration rotation, to be input to the third sun gear S3 through the third clutch C3. The engaging of the second clutch C2 causes the input rotation to be input to the second carrier CR2. In this state, the deceleration rotation that is input to the third sun gear S3 and the input rotation that is input to the second carrier CR2 generate an acceleration rotation slightly faster than the input rotation, such that the acceleration rotation is output to the second ring gear R2, and the forward rotation is output as the seventh forward speed from the counter gear 8.

In an eighth forward (8th) speed, the second clutch C2 is engaged, and the first brake B1 is engaged. The engaging of the second clutch C2 causes the input rotation to be input to the second carrier CR2. The engaging of the first brake B1 also makes the rotation of the third sun gear S3 stationary. Because the third sun gear S3 is stationary, the input rotation of the second carrier CR2 becomes faster than in the seventh forward speed, such that the input rotation is output to the second ring gear R2, and the forward rotation is output as the eighth forward speed from the counter gear 8.

In a first reverse (Rev1) speed, the third clutch C3 is engaged, and the second brake B2 is engaged. In this state, the first sun gear S1, which is stationary, and the first carrier CR1, which does the input rotation, cause the rotation of the first ring gear R1, which does the deceleration rotation, to be input to the third sun gear S3 through the third clutch C3. The engaging of the second brake B2 also makes the rotation of the second carrier CR2 stationary. The deceleration rotation that is input to the third sun gear S3 is thus output to the second ring gear R2 through the stationary second carrier CR2, and the reverse rotation is output as the first reverse speed from the counter gear 8.

In a second reverse (Rev2) speed, the fourth clutch C4 is engaged, and the second brake B2 is engaged. The engaging of the fourth clutch C4 causes the input rotation of the first carrier CR1 to be input to the third sun gear S3. The engaging of the second brake B2 also makes the rotation of the second carrier CR2 stationary. The input rotation that is input to the third sun gear S3 is thus output to the second ring gear R2 through the stationary second carrier CR2, and the reverse rotation is output as the second reverse speed from the counter gear 8.

Note that in the Park (P) range and the Neutral (N) range, the first clutch C1, the second clutch C2, the third clutch C3, and the fourth clutch C4 are released. In these states, the first carrier CR1 and the third sun gear S3 are not connected, and the first ring gear R1, the third sun gear S3, and the second sun gear S2 are not connected. That is, the planetary gear DP and the planetary gear unit PU are not connected. Furthermore, the input shaft 7 and the second carrier CR2 are not connected. This means that the transmission of power between the input shaft 7 and the planetary gear unit PU is cut off. In other words, the transmission of power between the input shaft 7 and the counter gear 8 is cut off.

Next, the main elements of the present invention, the third clutch C3 (second clutch) and the fourth clutch C4 (first clutch), will be explained below with reference to FIGS. 3 to 5.

The third clutch C3 and the fourth clutch C4 are disposed adjacent to one another in an automatic transmission $1_1$ according to the present invention. The third and fourth clutches C3, C4 are disposed in the general axial direction at a front portion of a speed change mechanism $3_1$, between the planetary gear DP and an oil pump (not shown) that is to the rear of the torque converter 2. The third and fourth clutches C3, C4 are disposed in the radial direction on the outer perimeter side of the boss portion 6a, which is integratedly formed with the case 6 and extends from the oil pump body.

Specifically, the boss portion 6a is integratedly formed such that a cylinder portion 71 that extends from the oil pump body is fitted to a stator shaft 72 that is disposed running through the inside of the oil pump so as to support a stator (not shown) of the torque converter 2. The input shaft 7 is rotatably supported in relation to the boss portion 6a on the inner perimeter side of the boss portion 6a (stator shaft 72) through a bushing b1, and the first sun gear S1 is held stationary on the rear end portion of the boss portion 6a (stator shaft 72).

The third clutch C3 is disposed on the outer perimeter side of the fourth clutch C4. In other words, the fourth clutch C4 is disposed on the inner perimeter side of the third clutch C3. Namely, the third clutch C3 is a multi-disc type that includes a plurality of friction plates 31 that are each formed from an outer friction plate 31a and an inner friction plate 31b, and a hydraulic servo 30 that connects and disconnects the friction plates 31, while the fourth clutch C4 includes a plurality of friction plates 41 that are each formed from an outer friction plate 41a and an inner friction plate 41b, and a hydraulic servo 40 that connects and disconnects the friction plates 41. The friction plate 31 on the outer perimeter side is disposed partially overlapping with the friction plate 41 on the inner perimeter side in the axial direction (as seen from the radial direction). The hydraulic servo 30 on the outer perimeter side and the hydraulic servo 40 on the inner perimeter side are disposed overlapping in the general axial direction.

Next, the structure of the third clutch C3 and the fourth clutch C4 will be explained in detail. A bicylindrical member 50 is rotatably disposed on the boss portion 6a through a bearing b2 and a sleeve member 52. As FIGS. 3 and 5 show, an inner cylinder portion 50a formed into a cylindrical shape on the inner perimeter side, an outer cylinder portion 50c formed into a cylindrical shape on the outer perimeter side, and a flange portion 50b that connects the front sides of the inner cylinder portion 50a and the outer cylinder portion 50c are integratedly formed to roughly structure the bicylindrical member 50.

Furthermore, the inner cylinder portion 50a structures a first base portion having a cylindrical shape, with the hydraulic servo 40 of the fourth clutch C4 disposed (and in particular a piston 43 described later slidably disposed) on the outer perimeter side of the inner cylinder portion 50a. The outer cylinder portion 50c structures a second base portion having a cylindrical shape, with the hydraulic servo 30 of the third clutch C3 disposed (and in particular a piston 33 described later slidably disposed) on the outer perimeter side of the outer cylinder portion 50c.

Figure 5:
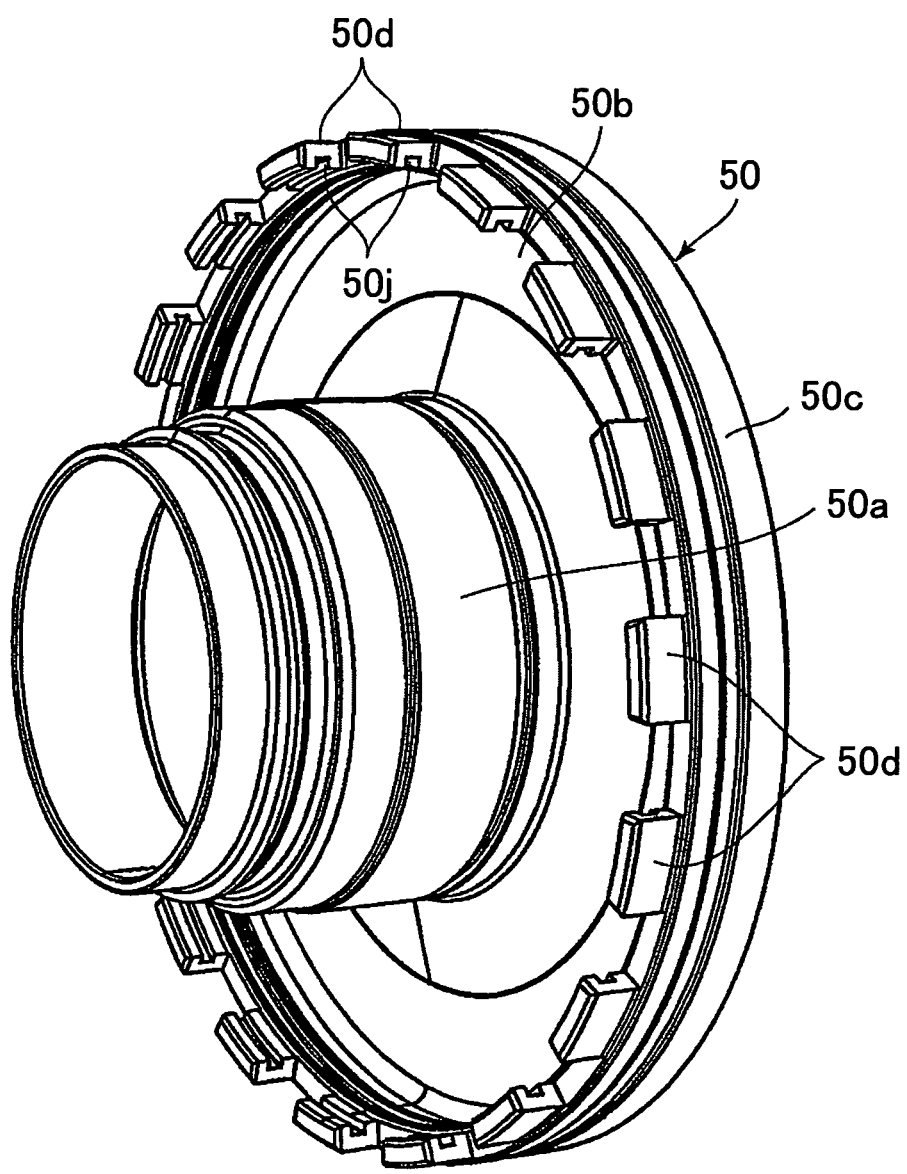
FIG. 5 is a perspective view that shows a bicylindrical member.

As described in more detail later, a plurality of end portions 50d of the outer cylinder portion 50c is formed into a comb shape as shown in FIG. 5, and the inner perimeter sides of the end portions 50d are each further formed with a snap ring groove 50j.

As shown in FIG. 3, the hydraulic servo 30 of the third clutch C3 is disposed on the outer perimeter side of the outer cylinder portion 50c, and includes a clutch drum 32, a piston 33, a cancel plate 34, and a return spring 35. A hydraulic oil chamber 36 is formed between the clutch drum 32 and the piston 33, and a cancel oil chamber 37 is formed between the piston 33 and the cancel plate 34 (on the side of the piston 33 opposite from the hydraulic oil chamber 36).

The clutch drum 32 includes a drum portion 32a on the outer perimeter side, and a flange portion 32b on the front side. A spline 32s is formed on the inner perimeter side of the drum portion 32a in spline engagement with the outer friction plate 31a, and a snap ring 39 is also fitted to the inner perimeter side of the drum portion 32a, thereby positioning the friction plate 31 in the axial direction.

Note that the inner friction plate 31b of the friction plate 31 is in spline engagement with a clutch hub 61, and the clutch hub 61 is connected to the first ring gear R1 of the planetary gear DP (see FIG. 1), that is, the inner friction plate 31b of the friction plate 31 is input with the deceleration rotation. In addition, a brake band of the first brake B1 is provided around the outer perimeter side of the drum portion 32a.

The inner perimeter side of the flange portion 32b of the clutch drum 32 is attached by welding or the like to the front side of the flange portion 50b of the bicylindrical member 50. The clutch drum 32 and the bicylindrical member 50 structure the clutch drum of the third clutch C3, which surround a clutch drum 42 of the fourth clutch C4 in the broadest sense of the term. The rear surface (surface on the left side in the drawing) of the flange portion 32b of the clutch drum 32 is formed as a cylinder portion 32c of the hydraulic oil chamber 36, and an oil passage c34 for the hydraulic oil chamber 36 is formed in the space between the rear surface of the flange portion 32b and the flange portion 50b of the bicylindrical member 50.

An inner perimeter portion of the piston 33 is slidably supported on the outer cylinder portion 50c of the bicylindrical member 50. The hydraulic oil chamber 36 is made oil-tight by sealing the space between the piston 33 and the outer cylinder portion 50c using a seal ring a1 and sealing the space between the clutch drum 32 and the piston 33 using a seal ring a2. In addition, an end portion 33a of the piston 33 is formed with spline teeth so as to be in spline engagement with the spline 32s of the clutch drum 32, thus preventing relative rotation.

The inner perimeter side of the cancel plate 34 is supported on the outer cylinder portion 50c of the bicylindrical member 50, and a return spring 35 is interposed between the piston 33 and the cancel plate 34. The cancel plate 34 also contacts the clutch drum 42 of the fourth clutch C4 as described in detail later. The cancel plate 34 is positioned and supported in the axial direction in the form of the clutch drum 42 receiving the biasing force (reaction force) of the return spring 35. The cancel oil chamber 37 is made oil-tight by sealing the space between the cancel plate 34 and the outer cylinder portion 50c using a seal ring a3 and sealing the space between the piston 33 and the outer cylinder portion 50c of the bicylindrical member 50 using a seal ring a4.

Meanwhile, the hydraulic servo 40 of the fourth clutch C4 is disposed on the outer perimeter side of the inner cylinder portion 50a, and includes a clutch drum 42, a piston 43, a cancel plate 44, and a return spring 45. A hydraulic oil chamber 46 is formed between the clutch drum 42 and the piston 43, and a cancel oil chamber 47 is formed between the piston 43 and the cancel plate 44 (on the side of the piston 43 opposite from the hydraulic oil chamber 46).

Figure 4:
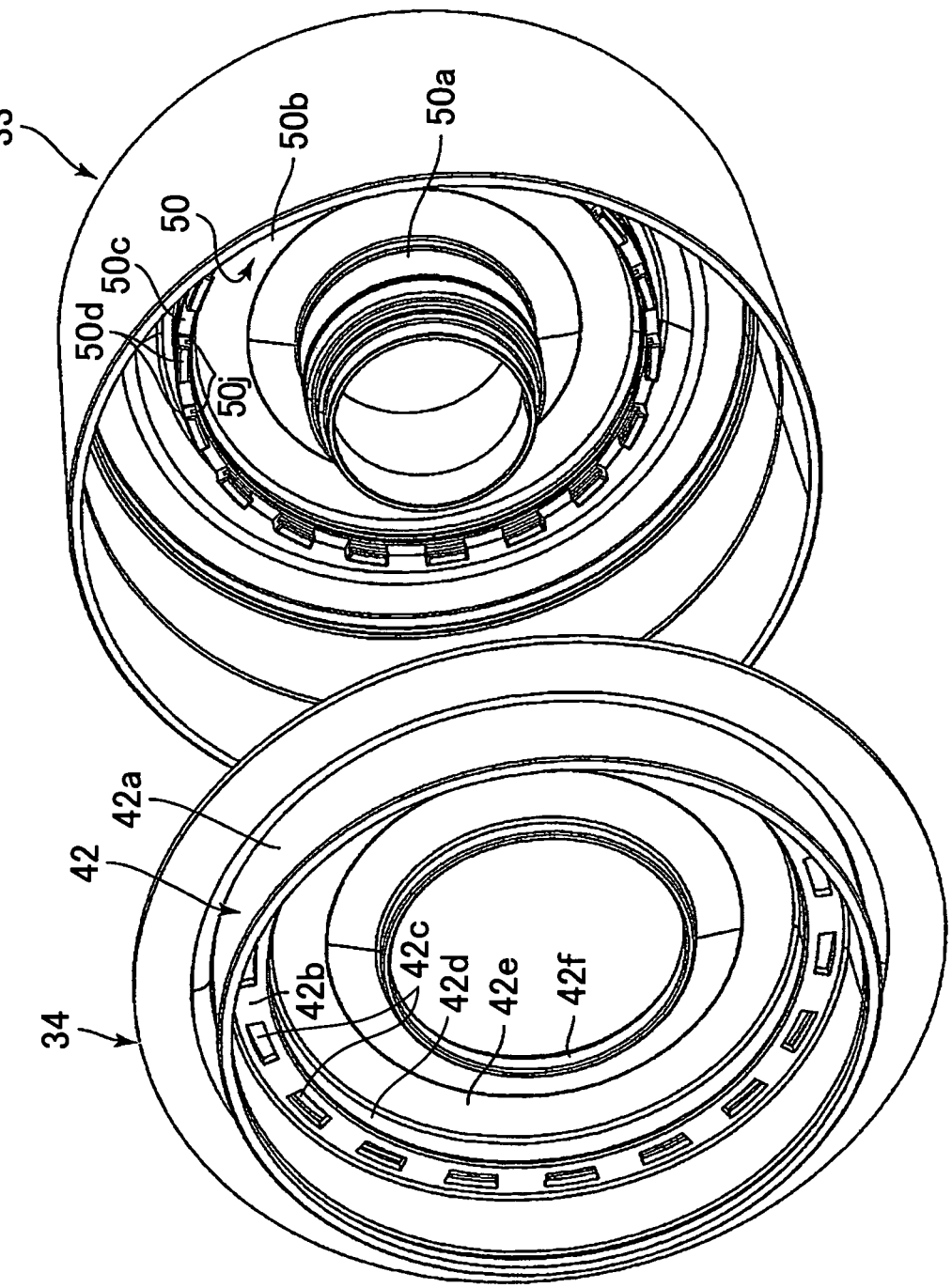
FIG. 4 is an exploded perspective view that shows a portion of the third and fourth clutches.

As shown in FIGS. 3 and 4, the clutch drum 42 includes the following as one integrated member: a drum portion 42a on the outer perimeter side; an outer-perimeter circular disc portion 42b that is generally perpendicular to the radial direction; an intermediate cylinder portion 42d that is formed into a cylindrical shape at an intermediate part; a flange portion 42e that is formed into a flange shape; and an inner-perimeter cylinder portion 42f that is formed into a cylindrical shape at an inner perimeter part. The inner perimeter side of the drum portion 42a is formed with a spline 42s that is in spline engagement with the outer friction plate 41a, and a snap ring 49 is also fitted to the inner perimeter side of the drum portion 42a, thereby positioning the friction plate 41 in the axial direction.

Note that the inner friction plate 41b of the friction plate 41 is in spline engagement with the clutch hub 62, and the clutch hub 62 is connected to the first carrier CR1 of the planetary gear DP (see FIG. 1), that is, the inner friction plate 31b of the friction plate 31 is input with the input rotation.

The intermediate cylinder portion 42d of the clutch drum 42 is fitted to the inner perimeter side of the outer cylinder portion 50c of the bicylindrical member 50 and sealed therewith using a seal ring a6. The inner-perimeter cylinder portion 42f is fitted to the inner perimeter side of the inner cylinder portion 50a of the bicylindrical member 50 and sealed therewith using a seal ring a5, that is, the inner perimeter side of the clutch drum 42 is supported by the inner cylinder portion 50a. An oil passage d4 for the cancel oil chamber 37 is formed between the clutch drum 42 and the bicylindrical member 50, and the rear surface (surface on the left side in the drawing) of the flange portion 42e is formed as a cylinder portion 42i of the hydraulic oil chamber 46.

As shown in FIG. 4, the outer-perimeter circular disc portion 42b is formed with a plurality of through holes 42c running therethrough in a manner that aligns with shape of the end portion 50d (see FIG. 5) formed into a comb shape on the outer cylinder portion 50c of the bicylindrical member 50. As shown in FIGS. 3 and 4, the outer cylinder portion 50c of the bicylindrical member 50 extends such that the end portion 50d intersects and runs through the through hole 42c of the clutch drum 42 at a more outer perimeter portion than the hydraulic oil chamber 46. The outer-perimeter circular disc portion 42b of the clutch drum 42 is restricted by a snap ring (restricting member) 51 in a direction that the outer-perimeter circular disc portion 42b is retained on the end portion 50d of the outer cylinder portion 50c of the bicylindrical member 50. That is, the clutch drum 42 is supported by the bicylindrical member 50 and the snap ring 51 near the outer edge on the outer perimeter side, and positioned fixed in the axial direction. Note that the snap ring 51 is fitted from the inner perimeter side of the end portion 50d of the outer cylinder portion 50c, and is formed less prone to detachment compared to that fitted to the outer perimeter side.

An inner perimeter portion of the piston 43 is slidably supported on the inner cylinder portion 50a of the bicylindrical member 50, as shown in FIG. 3. The hydraulic oil chamber 46 is made oil-tight by sealing the space between the piston 43 and the inner cylinder portion 50a using a seal ring a7 and sealing the space between the clutch drum 42 and the piston 43 using a seal ring a8. In addition, an outer-perimeter end portion 43a of the piston 43 is formed into a spline configuration (formed into spline teeth) so as to engage with the end portion 50d of the outer cylinder portion 50c of the bicylindrical member 50, thus preventing relative rotation. A structure can thus be achieved where the end portion 43a of the piston 43 is engaged to the end portion 50d of the outer cylinder portion 50c, and the outer cylinder portion 50c intersects and runs through the clutch drum 42 to prevent rotation of the piston 43.

Note that the end portion 43a of the piston 43 is formed with a greater thickness than the piston stroke when the piston moves due to releasing of the fourth clutch C4, and even when the fourth clutch C4 is engaged, the end portion 43a does not detach from the end portion 50d of the outer cylinder portion 50c of the bicylindrical member 50. The piston 43 is also formed with a protruding portion 43b on the clutch drum 42 side to prevent the piston 43 from adhering to the clutch drum 42 with no space left therebetween.

The inner perimeter portion of the cancel plate 44 is supported on the inner cylinder portion 50a of the bicylindrical member 50. The return spring 45 is interposed between the cancel plate 44 and the piston 43. That is, the cancel plate 44 is positioned and fixed in the axial direction by a snap ring 48 in the form of the cancel plate 44 receiving the biasing force (reaction force) of the return spring 45 through the snap ring 48. In addition, the cancel oil chamber 47 is made oil-tight by sealing the space between the cancel plate 44 and the piston 43 using a seal ring a9.

Next, the oil passage configuration pertaining to the third clutch C3 and the fourth clutch C4 will be explained with reference to FIG. 3. Oil delivered to the hydraulic oil chamber 36 of the hydraulic servo 30 of the third clutch C3, namely the hydraulic pressure of the third clutch C3, is guided to an oil passage c31 formed inside the boss portion 6a, via oil passages formed from a hydraulic control device (valve body) that is not shown in the drawing to the oil pump body or the like.

The oil passage c31 communicates with an oil passage c32 formed heading toward the outer perimeter side. The oil passage c31 is also sealed by seal rings, a11, a12, and in communication with a through hole 52a of the sleeve member 52. The through hole 52a communicates with an oil passage c33 that is formed between the sleeve member 52 and the bicylindrical member 50, and further communicates with a through hole 50e that is formed so as to run from the inner perimeter surface of the inner cylinder portion 50a of the bicylindrical member 50 through to the front surface (surface on the right side in the drawing) of the flange portion 50b. The through hole 50e is in communication with an oil passage c34 formed between the bicylindrical member 50 and the clutch drum 32, and the oil passage c34 communicates with the hydraulic oil chamber 36.

Note that according to the present embodiment, a "supply oil passage of hydraulic pressure for the third clutch C3" refers to the oil passage c31, the oil passage c32, the through hole 52a of the sleeve member 52, the oil passage c33, the through hole 50e, and the oil passage c34. In addition, the "hydraulic oil chamber 36" is more toward the outer perimeter side than the outer perimeter surface of the outer cylinder portion 50c of the bicylindrical member 50, and the term refers to a portion that corresponds to the chamber surface area that pushes the piston 33.

Meanwhile, oil delivered to the hydraulic oil chamber 46 of the hydraulic servo 40 of the fourth clutch C4, namely the hydraulic pressure of the fourth clutch C4, is guided to an oil passage c41 formed inside the boss portion 6a, via oil passages formed from a hydraulic control device (valve body) that is not shown in the drawing to the oil pump body or the like.

The oil passage c41 communicates with an oil passage c42 formed heading toward the outer perimeter side. The oil passage c41 is also sealed by seal rings a13, a14, and in communication with a through hole 52c of the sleeve member 52. The through hole 52c communicates with an oil passage c43 that is formed between the sleeve member 52 and the bicylindrical member 50, and further communicates with a through hole 50g that is formed so as to run from the inner perimeter surface of the inner cylinder portion 50a of the bicylindrical member 50 through to the outer perimeter surface. An outer-perimeter outlet of the through hole 50g is in communication with the hydraulic oil chamber 46.

Note that according to the present embodiment, a "supply oil passage of hydraulic pressure for the fourth clutch C4" refers to the oil passage c41, the oil passage c42, the through hole 52c of the sleeve member 52, the oil passage c43, and the through hole 50g. In addition, the "hydraulic oil chamber 46" is more toward the outer perimeter side than the outer perimeter surface of the inner cylinder portion 50a of the bicylindrical member 50, and the term refers to a portion that corresponds to the chamber surface area that pushes the piston 43.

Oil that is supplied as lubrication oil, for example, is used as the oil delivered to the cancel oil chambers 37, 47 of the third clutch C3 and the fourth clutch C4, and such oil is guided to an oil passage d1 formed inside the boss portion 6a, via oil passages formed from a hydraulic control device (valve body) that is not shown in the drawing to the oil pump body or the like.

The oil passage d1 communicates with an oil passage d2 formed heading toward the outer perimeter side. The oil passage d1 is also sealed by the seal rings a12, a13, and in communication with a through hole 52b of the sleeve member 52. The through hole 52b further communicates with an oil passage d3 formed between the sleeve member 52 and the bicylindrical member 50. The oil passage d3 communicates with a through hole 50h that is formed so as to run from the inner perimeter surface of the inner cylinder portion 50a of the bicylindrical member 50 through to the outer perimeter surface. An outer-perimeter outlet of the through hole 50h is in communication with the cancel oil chamber 47 of the fourth clutch C4. Furthermore, when the piston 43 of the clutch C4 is driven and the cancel oil chamber 47 narrowed, centrifugal force causes oil inside the cancel oil chamber 47 to be thrown toward the outer perimeter side from a notch 44a formed on the inner perimeter side of the cancel plate 44.

The oil passage d3 also communicates with a through hole 50f that is formed so as to run through the inner cylinder portion 50a of the bicylindrical member 50. The through hole 50f is in communication with the oil passage d4 that is formed between the bicylindrical member 50 and the clutch drum 42. The oil passage d4 also communicates with a through hole 50i that is formed so as to run the outer cylinder portion 50c of the bicylindrical member 50. An outer-perimeter outlet of the through hole 50i is in communication with the cancel oil chamber 37 of the third clutch C3. Furthermore, when the piston 33 of the clutch C3 is driven and the cancel oil chamber 37 narrowed, centrifugal force causes oil inside the cancel oil chamber 37 to be thrown toward the outer perimeter side from the notch 44a via the through hole 50i, the oil passage d4, the through hole 50f, the oil passage d3, the through hole 50h, and the cancel oil chamber 47 of the fourth clutch C4. Oil inside the cancel oil chamber 37 is thus delivered to the cancel oil chamber 47 of the clutch C4, and discharged along with oil in the cancel oil chamber 47 from the notch 44a. Because a discharge pathway can be shared for oil from the cancel oil chambers of the clutch C3 and the clutch C4, less time is needed to machine oil passages compared to that needed to establish separate discharge pathways.

Note that according to the present embodiment, an "oil passage for the cancel oil chamber 47 of the fourth clutch C4" refers to the oil passage d1, the oil passage d2, the through hole 52b of the sleeve member 52, the oil passage d3, and the through hole 50h. In addition, the "cancel oil chamber 47" is more toward the outer perimeter side than the outer perimeter surface of the inner cylinder portion 50a of the bicylindrical member 50, and the term refers to a portion that corresponds to an effective surface area that applies centrifugal hydraulic pressure to the piston 43. Moreover, an "oil passage for the cancel oil chamber 37 of the third clutch C3" refers to the oil passage d1, the oil passage d2, the through hole 52b of the sleeve member 52, the oil passage d3, the through hole 50f, the oil passage d4, and the through hole 50i. In addition, the "cancel oil chamber 37" is more toward the outer perimeter side than the outer perimeter surface of the outer cylinder portion 50c of the bicylindrical member 50, and the term refers to a portion that corresponds to an effective surface area that applies centrifugal hydraulic pressure to the piston 33.

The oil passage d1 is also formed with an oil passage d5 that projects from the rear side of the oil passage d1 toward the bearing b2. Lubrication oil can thus be delivered to the bearings and the planetary gear DP (see FIG. 1).

Next, the operation of the third clutch C3 and the fourth clutch C4 will be explained. When it is determined that the fourth clutch C4 has switched from a released state to engagement, engagement pressure from a hydraulic control device (not shown) is delivered to the hydraulic oil chamber 46 of the fourth clutch C4. The piston 43 slides on the inner cylinder portion 50a of the bicylindrical member 50 against the biasing force of the return spring 45, and is driven rearward to press the friction plate 41 so that the friction plate 41 engages.

At such time, the force of the piston 43 pressing rearward (leftward in the drawing) due to the engagement pressure of the hydraulic oil chamber 46 is transmitted to the drum portion 42a of the clutch drum 42 through the friction plate 41 and the snap ring 49. In the clutch drum 42, this force balances out the force pressing forward (rightward in the drawing) due to the engagement pressure of the hydraulic oil chamber 46, thus establishing a mechanical closed-loop system.

When the fourth clutch C4 is released, the piston 43 is pressed by the return spring 45 and returns to the front side. The biasing force of the return spring 45 also similarly establishes a closed-loop system through the bicylindrical member 50 because the piston 43 abuts the clutch drum 42. In this case, even when the hydraulic servo 40 of the fourth clutch C4 is rotating, centrifugal hydraulic pressure based on the centrifugal force generated by oil in the hydraulic oil chamber 46 and oil in the cancel oil chamber 47 act in directions that counter the piston 43. The centrifugal hydraulic pressure that presses the clutch drum 42 forward balances out the centrifugal hydraulic pressure generated in the oil passage d4. The centrifugal hydraulic pressure that acts on the inner cylinder portion 50a of the bicylindrical member 50 through the snap ring 48 and presses the cancel plate 44 rearward forms a closed-loop system with and negates the force that presses the flange portion 50b of the bicylindrical member 50 forward (rightward in the drawing). In other words, the centrifugal hydraulic pressure generated in the hydraulic servo 40 is completely canceled out.

When it is determined that the third clutch C3 has switched from a released state to engagement, engagement pressure from a hydraulic control device (not shown) is delivered to the hydraulic oil chamber 36 of the third clutch C3. The piston 33 slides on the outer cylinder portion 50c of the bicylindrical member 50 against the biasing force of the return spring 35, and is driven rearward to press the friction plate 31 so that the friction plate 31 engages.

At such time, the force of the piston 33 pressing rearward (leftward in the drawing) due to the engagement pressure of the hydraulic oil chamber 36 is transmitted to the drum portion 32a of the clutch drum 32 through the friction plate 31 and the snap ring 39. In the clutch drum 32, this force balances out the force pressing forward (rightward in the drawing) due to the engagement pressure of the hydraulic oil chamber 36, thus establishing a mechanical closed-loop system.

When the third clutch C3 is released, the piston 33 is pressed by the return spring 35 and returns to the front side. The biasing force of the return spring 35 is transmitted to the outer cylinder portion 50c of the bicylindrical member 50 through the return spring 35, the cancel plate 34, the clutch drum 42, and the snap ring 51 because the piston 33 abuts the clutch drum 32. These forces, especially the force received from the snap ring 51, are combined and transmitted from the integrally formed bicylindrical member 50 to the clutch drum 32, and negate the forward (rightward in the drawing) pressing force generated in the cylinder portion 32c of the clutch drum 32 due to the engagement pressure of the hydraulic oil chamber 36. In other words, a closed-loop system is similarly established through the bicylindrical member 50. In this case, even when the hydraulic servo 30 of the third clutch C3 is rotating, centrifugal hydraulic pressure based on centrifugal force generated from the oil in the hydraulic oil chamber 36 and oil in the cancel oil chamber 37 act in directions that counter the piston 33. The centrifugal hydraulic pressure that presses the clutch drum 32 forward forms a closed-loop system similar to that above with the centrifugal hydraulic pressure that presses the cancel plate 34 rearward and the two pressures negate each other. In other words, the centrifugal hydraulic pressure generated in the hydraulic servo 30 is completely canceled out.

However, although a mechanical closed-loop system is established in the hydraulic servo 30 of the third clutch C3 described above, the rearward (leftward in the drawing) pressing force generated in the cancel plate 34, especially the force generated by the centrifugal hydraulic pressure of the cancel oil chamber 37, presses the clutch drum 42 of the fourth clutch C4. Centrifugal hydraulic pressure is also generated in the oil present in the oil passage d4 that communicates with the cancel oil chamber 37. Therefore, the centrifugal hydraulic pressure in the oil passage d4 also causes the clutch drum 42 to be pressed rearward.

According to the automatic transmission $1_1$ of the present invention, the outer cylinder portion 50c of the bicylindrical member 50 is provided extending such that the end portion 50d intersects and runs through a more outer perimeter portion of the clutch drum 42 of the fourth clutch C4 than the hydraulic oil chamber 46. The snap ring 51 restricts the clutch drum 42 in the direction that the clutch drum 42 is retained with the end portion 50d of the outer cylinder portion 50c, which runs through the clutch drum 42. Furthermore, the clutch drum 42 is especially supported on the outer cylinder portion 50c of the bicylindrical member 50 that is strongly formed with a thick thickness. Therefore, the clutch drum 42 can be supported more toward the outer perimeter side by the snap ring 51 and the outer cylinder portion 50c.

In other words, compared to positioning and fixing the clutch drum 42 on the inner cylinder portion 50a using a snap ring or the like, for example, the clutch drum 42 can be supported on the outer perimeter side by the outer cylinder portion 50c so that the fulcrum of the moment generated in the clutch drum 42 is located on the outer perimeter side, thus preventing the generation of a large torsional moment whose fulcrum is on the inner perimeter side. Consequently, deformation of the clutch drum 42 can be suppressed.

Accordingly, if the fourth clutch C4 and the third clutch C3 are disposed adjacent in order to maintain compactness, and the clutch drum 42 of the fourth clutch C4 is pressed from behind by the centrifugal hydraulic pressure of the cancel oil chamber 37 of the third clutch C3, deformation of the clutch drum 42 of the fourth clutch C4 can be suppressed without increasing the thickness of the clutch drum 42. In other words, durability can be improved while maintaining compactness. Furthermore, clutch controllability can also be improved without adversely affecting the orientation of the friction plate 41.

In the automatic transmission $1_1$ according to the present invention, the cancel plate 34 of the third clutch C3 is disposed on the outer cylinder portion 50c, and is directly contacted and supported by the clutch drum 42 of the fourth clutch C4. Therefore, compared to when the cancel plate 34 of the third clutch C3 is positioned and supported on the outer cylinder portion 50c by a snap ring or the like, for example, one less snap ring is required and the automatic transmission $1_1$ can be made more compact in the axial direction by a corresponding amount. Having the cancel plate 34 directly supported by the clutch drum 42 in this manner allows the centrifugal hydraulic pressure of the cancel oil chamber 37 to act on the clutch drum 42 through the cancel plate 34. However, in the automatic transmission $1_1$ according to the present invention, the clutch drum 42 can be supported more toward the outer perimeter side as explained above, which reduces the number of snap rings while also suppressing deformation of the clutch drum 42.

Furthermore, the inner cylinder portion 50a and the outer cylinder portion 50c in particular are integratedly formed through the flange portion 50b, that is, in order to support two hydraulic servos, the hydraulic servo 30 and the hydraulic servo 40, the bicylindrical member 50 is formed as an considerably strong member having a thick thickness in which the inner cylinder portion 50a and the outer cylinder portion 50c are integratedly formed. Therefore, the bicylindrical member 50 has sufficient strength to serve as a member for supporting (reinforcing) the clutch drum 42, and can thus suppress deformation of the clutch drum 42.

An automatic transmission $1_2$, which is another embodiment that partially modifies the automatic transmission $1_1$ described above, will be explained now with reference to FIG. 6. Note that in the description of the automatic transmission $1_2$ according to the present invention, only portions different from the automatic transmission $1_1$ will be explained as a general rule, with like symbols used for like portions and accompanying descriptions thereof omitted.

As shown in FIG. 6, compared to the automatic transmission $1_1$ (see FIG. 3), the automatic transmission $1_2$ according to the present invention is formed with the clutch drum 42 divided into a drum member 42A that is in spline engagement with the friction plate 41, and a cylinder member 42B that structures the hydraulic oil chamber 46.

More specifically, in an automatic speed change mechanism $3_2$ of the automatic transmission $1_2$ according to the present invention, the drum member 42A of the clutch drum 42 is structured from the drum portion 42a formed with the spline 42s, and the outer-perimeter circular disc portion 42b formed with the through hole 42c. Meanwhile, the cylinder member 42B is structured from the intermediate cylinder portion 42d formed into a cylindrical shape, the flange portion 42e formed into a flange shape, and the inner-perimeter cylinder portion 42f whose inner perimeter portion is formed into a cylindrical shape. In addition, an end portion of the intermediate cylinder portion 42d is contacted and supported by an inner-perimeter portion of the outer-perimeter circular disc portion 42b of the drum member 42A, such that the cylinder member 42B is positioned and supported with respect to the bicylindrical member 50.

Note that in the present embodiment, by forming the through hole 42c in the drum member 42A, the through hole 42c also intersects and runs through the end portion 50d of the outer cylinder portion 50c of the bicylindrical member 50. However, because the drum member 42A and the cylinder member 42B are divided, the inner perimeter side of the outer-perimeter circular disc portion 42b of the drum member 42A may be formed into a comb shape.

Thus according to the automatic transmission $1_2$, dividing the clutch drum 42 into the drum member 42A having the spline 42s and the cylinder member 42B enables the cylinder member 42B to be formed by press work, which can achieve a cost reduction.

In addition, the flange portion 42e of the cylinder member 42B includes the first protruding portion 42g that projects toward the piston 43 side, and the second protruding portion 42h that projects toward the flange portion 50b side of the bicylindrical member 50. The first and second protruding portions 42g, 42h are disposed out of phase at different positions on the same radius. This configuration enables the cylinder member 42B to be formed by simple press work alone, and prevents attachment between the cylinder member 42B and the piston 43. Clearance for the oil passage d4 formed between the cylinder member 42B and the flange portion 50b can also be secured.

Furthermore, even if forces generated from the cancel plate 34 and from the centrifugal hydraulic pressure of the oil passage d4 act in the direction of the rear side of the clutch drum 42 of the automatic transmission $1_2$ according to the present invention, the clutch drum 42 overall does not deform so as to twist about an inner perimeter portion acting as a fulcrum. In particular, clutch controllability can be improved without affecting the orientation of the friction plate 41 in spite of any slight overall movement of the drum member 42A toward the rear side.

Operations and effects of the automatic transmission $1_2$ in addition to the portions described above are identical to the automatic transmission $1_1$ and thus omitted here.

In the embodiment explained above, an example was given in which the present invention achieves eight forward speeds and two reverse speeds as a multi-speed automatic transmission and is applied to the third clutch C3 and the fourth clutch C4. However, the present invention is not limited to this example. The present invention is applicable to any type of automatic transmission provided that two clutch are disposed adjacent in the automatic transmission.

In the embodiment described above, an example was given in which the hydraulic servo 30 of the third clutch C3 and the hydraulic servo 40 of the fourth clutch C4 are arranged in a two-tiered configuration on inner and outer perimeter sides. However, the present invention is not limited to this example. The present invention is applicable to any device provided that the force generated in the hydraulic servo of one clutch is transmitted to the clutch drum of the other clutch. The force generated in the hydraulic servo is not limited to only a force generated inside the hydraulic servo; forces generated in oil passages leading to the hydraulic servo (such as the oil passage d4) as in the present embodiment are also included.

The automatic transmission according to the present invention can be used as an automatic transmission installed in a passenger vehicle, truck, or the like, and is particularly well suited for use as an automatic transmission that aims to maintain the compactness achieved by an adjacent arrangement of two clutches while suppressing deformation of a clutch drum of the clutch on the inner side.

The invention claimed is:

1. An automatic transmission comprising:
   first and second clutches disposed adjacent, wherein each of the first and second clutches includes:
   a friction plate;
   a clutch drum in spline engagement with the friction plate;
   a piston that with the clutch drum forms a hydraulic oil chamber therebetween;
   a return spring that biases the piston toward the hydraulic oil chamber side; and
   a cancel plate that is disposed on a side opposite the hydraulic oil chamber of the piston to form a cancel oil chamber that cancels outs a centrifugal hydraulic pressure that acts on the hydraulic oil chamber, and that receives a reaction force of the return spring, wherein
   the clutch drum of the second clutch comprises a first base portion having a cylindrical shape that surrounds the clutch drum of the first clutch and supports the clutch drum of the first clutch on an inner perimeter side of the clutch drum of the first clutch; and a second base portion having a cylindrical shape that is disposed more toward an outer perimeter side than the first base portion, and supports the cancel plate of the second clutch on the inner perimeter side of the cancel plate of the second clutch,
   the second base portion includes an end portion that intersects and runs through the clutch drum of the first clutch at a more outer perimeter portion than the hydraulic oil chamber of the first clutch,
   a restricting member is provided that restricts the clutch drum of the first clutch in a direction that the clutch drum is retained on the end portion of the second base portion running therethrough, and
   the cancel plate of the second clutch is contacted and supported by the clutch drum of the first clutch.

2. The automatic transmission according to claim 1, wherein
   the first base portion and the second base portion are integratedly formed through a flange portion.

3. The automatic transmission according to claim 2, wherein
   an oil passage that communicates with the cancel oil chamber of the second clutch is formed between the clutch drum of the first clutch and the flange portion by sealing spaces between the first base portion and the clutch drum of the first clutch and the second base portion and the clutch drum of the first clutch.

4. The automatic transmission according to claim 2, wherein
   the clutch drum of the first clutch is formed divided into a drum member that is engaged with the friction plate, and a cylinder member that forms the hydraulic oil chamber and is supported by the drum member in an axial direction,
   the drum member of the clutch drum of the first clutch is supported by the second base portion through the restricting member, and
   an oil passage that communicates with the cancel oil chamber of the second clutch is formed between the cylinder member and the flange portion by sealing spaces between the first base portion and the cylinder member, and the second base portion and the cylinder member.

5. The automatic transmission according to claim 4, wherein
   the cylinder member is press-worked so as to have a first protruding portion that projects toward the piston side, and a second protruding portion that projects toward the flange portion side, wherein
   the first and second protruding portions are disposed out of phase at different positions on the same radius.

6. The automatic transmission according to claim 1, wherein
   the end portion of the second base portion is formed into a comb shape, and
   the clutch drum of the first clutch is formed into a shape that aligns with the comb shape and formed with a plurality of through holes through which the end portion of the second base portion runs through.

7. The automatic transmission according to claim 6, wherein
   an outer-perimeter end portion of the piston of the first clutch is formed into a spline configuration, and engaged relatively unrotatable to the comb-shaped end portion of the second base portion.

8. An automatic transmission comprising:
   first and second clutches disposed adjacent, wherein each of the first and second clutches includes:
   a friction plate;
   a clutch drum in spline engagement with the friction plate;
   a piston that is used to form a hydraulic oil chamber;
   a return spring that biases the piston toward the hydraulic oil chamber side; and
   a cancel plate that is disposed on a side opposite the hydraulic oil chamber of the piston to form a cancel oil chamber that cancels outs a centrifugal hydraulic pressure that acts on the hydraulic oil chamber, and that receives a reaction force of the return spring, wherein
   the clutch drum of the second clutch surrounds the clutch drum of the first clutch so that the clutch drum of the first clutch and the clutch drum of the second clutch have the same rotation and no relative rotation, the clutch drum of the second clutch includes a first base portion that supports the piston of the first clutch on an inner perimeter side of the piston of the first clutch, the clutch drum of the second clutch includes a second base portion that is disposed more toward an outer perimeter side than the hydraulic oil chamber of the first clutch that is formed by the piston of the first clutch and the first base portion, and supports the cancel plate of the second clutch on the inner perimeter side of the cancel plate of the second clutch and the piston of the second clutch on the inner perimeter side of the piston of the second clutch, a restricting member is provided that restricts the clutch drum of the first clutch in a direction that the clutch drum of the first clutch is retained on the second base portion, and the cancel plate of the second clutch is contacted directly by the clutch drum of the first clutch in a direction that the cancel plate of the second clutch is retained in an axial direction on the second base portion.

9. The automatic transmission according to claim 8, wherein a diameter of the inner perimeter side of the cancel plate of the second clutch is smaller than a diameter of the outer perimeter side of the clutch drum of the first clutch.

10. The automatic transmission according to claim 9, wherein the clutch drum of the first clutch includes a circular disc portion that is generally perpendicular to the radial direction, and the circular disc portion contacts with an inner perimeter portion of the cancel plate of the second clutch.

11. The automatic transmission according to claim 8, wherein a diameter of the inner perimeter side of the piston of the second clutch is smaller than a diameter of the outer perimeter side of the clutch drum of the first clutch.

* * * * *